(12) United States Patent
Eberlein et al.

(10) Patent No.: US 11,907,198 B2
(45) Date of Patent: Feb. 20, 2024

(54) SELECTIVE RECOMMENDATION AND DEPLOYMENT OF EXTENSIONS IN LOW-CODE APPROACH

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

(*) Notice: Subject to any disclaimer, the term of this patent is extended or adjusted under 35 U.S.C. 154(b) by 12 days.

(21) Appl. No.: 17/231,076

(22) Filed: Apr. 15, 2021

(65) Prior Publication Data

US 2022/0335031 A1 Oct. 20, 2022

(51) Int. Cl.
*G06F 16/23* (2019.01)
*G06F 16/242* (2019.01)
*G06N 20/00* (2019.01)
*G06F 16/2457* (2019.01)

(52) U.S. Cl.
CPC ...... *G06F 16/2358* (2019.01); *G06F 16/2365* (2019.01); *G06F 16/2448* (2019.01); *G06F 16/2457* (2019.01); *G06N 20/00* (2019.01)

(58) Field of Classification Search
CPC ............. G06F 16/2358; G06F 16/2448; G06F 16/2365; G06F 16/2457; G06N 20/00
See application file for complete search history.

(56) References Cited

U.S. PATENT DOCUMENTS

| | | | |
|---|---|---|---|
| 10,534,585 B1 | 1/2020 | Eberlein et al. | |
| 2003/0154216 A1* | 8/2003 | Arnold | G06F 16/211 |
| 2014/0033101 A1* | 1/2014 | Rein | G06F 16/2358 |
| | | | 715/771 |
| 2014/0172775 A1* | 6/2014 | Niehoff | G06F 16/284 |
| | | | 707/600 |
| 2017/0161358 A1* | 6/2017 | Tadeski | G06F 16/2365 |
| 2017/0322783 A1* | 11/2017 | Khoyi | G06F 8/35 |

(Continued)

OTHER PUBLICATIONS

Aws.amazon.com [online], "Automatically extract text and structured data from documents with Amazon Textract" May 2019, [retrieved on Apr. 8, 2021], retrieved from: URL <https://aws.amazon.com/blogs/machine-learning/automatically-extract-text-and-structured-data-from documents- with-amazon-textract/>, 20 pages.

(Continued)

*Primary Examiner* — Mark D Featherstone
*Assistant Examiner* — Ranjit P Doraiswamy
(74) *Attorney, Agent, or Firm* — Fish & Richardson P.C.

(57) ABSTRACT

Implementations include querying metadata of data objects to define a sub-set of data objects, each data object in the sub-set of data objects including a generic text field and/or an attachment field, and, for each data object in the sub-set of data objects, processing historical data of a data object to identify a set of data types, the historical data stored within a field of a table of a database system, providing a recommendation for a first extension corresponding to a first data type, and receiving user input indicating acceptance of the recommendation for the first extension and, in response, automatically providing extension code that is executable to add a field extension to the table and to modify a UI of an application for input of values corresponding to the first data type, and executing the extension code to deploy the extension and to modify the UI.

20 Claims, 4 Drawing Sheets

(56) References Cited

U.S. PATENT DOCUMENTS

| | | | |
|---|---|---|---|
| 2020/0050431 A1* | 2/2020 | Zilouchian Moghaddam | ............. G06F 8/38 |
| 2021/0098099 A1* | 4/2021 | Neumann | .............. G06V 10/82 |

OTHER PUBLICATIONS

Cloud.google.com [online], "AutoML Tables Features and Capabilities" May 2020, [retrieved on Apr. 8, 2021], retrieved from: URL <https://cloud.google.com/automl-tables/docs/features>, 3 pages.

Docs.microsoft.com [online], "What is Automated Machine Learning (AutoML)" Oct. 2020, [retrieved on Apr. 8, 2021], retrieved from: URL <https://docs.microsoft.com/en-us/azure/machine-learning/concept-automated-ml>, 16 pages.

Help.sap.com [online], "Auto ML" Feb. 2021, [retrieved on Apr. 8, 2021], retrieved from: URL <https://help.sap.com/viewer/5ac15e8fccb447199fda4509e813bf9f/Cloud/en-US/1alfa25757104bcab27201ad2fa5cd33.html>, 1 page.

Sap.com [online], "SAP AI Business Services—Document Information Extraction" Oct. 2019, [retrieved on Apr. 8, 2021], retrieved from: URL <https://www.sap.com/assetdetail/2019/10/027635ce-6a7d-0010-87a3-c30de2ffd8ff.html>, 1 page.

Almonte et al., "Towards automating the construction of recommender systems for low-code development platforms." Proceedings of the 23rd ACM/IEEE International Conference on Model Driven Engineering Languages and Systems: Companion Proceedings, Oct. 2020, 10 pages.

Ángel et al., "Automated modelling assistance by integrating heterogeneous information sources." Computer Languages, Systems & Structures 53, Sep. 2018, 90-120, 31 pages.

Kögel et al., "Automatic Change Recommendation of Models and Meta Models Based on Change Histories." ME 2016—Models and Evolution Workshop Proceedings (Models 2016), Oct. 2016, 6 pages.

Kögel, "Recommender system for model driven software development." Proceedings of the 2017 11th Joint Meeting on Foundations of Software Engineering, Oct. 2020, 4 pages.

Martins et al., "An overview on how to develop a low-code application using OutSystems." 2020 International Conference on Smart Technologies in Computing, Electrical and Electronics (ICSTCEE). IEEE, Oct. 2020, 7 pages.

Sahay et al., "Supporting the understanding and comparison of low-code development platforms." 2020 46th Euromicro Conference on Software Engineering and Advanced Applications (SEAA). IEEE, Aug. 2020, 8 pages.

Extended European Search Report issued in European Application. No. 21199714.3 dated Apr. 4, 2022, 11 pages.

* cited by examiner

SELECTIVE RECOMMENDATION AND DEPLOYMENT OF EXTENSIONS IN LOW-CODE APPROACH

BACKGROUND

Software systems can be provisioned by software vendors to enable enterprises to conduct operations. Software systems can include various applications that provide functionality for execution of enterprise operations. Software vendors often provide software systems as off-premise applications that are executed in cloud computing environments, which can be referred to as cloud-based applications (e.g., applications provided in the so-called "Software-as-Service" (SaaS) paradigm). In some instances, software systems can include or operate in association with a database system. Applications can be provided in an application layer that overlies a database system and enables interactions with the database system (e.g., reading data, writing data, manipulating data). In general, database systems provide for storage, organization, and analysis of large volumes of data.

In some instances, software vendors seek to provide software applications with some level of configuration and enable customers (e.g., enterprises) to customize vendor-provided software (e.g., add custom code, modify existing code, use application programming interfaces (APIs) that are not declared as "release stable"), and/or data objects. For example, software vendors can provide standard data objects in deployed software systems, which can be populated with data that is stored in one or more database tables within a database system that an application interacts with. In some instances, customers seek to extend the data objects, and thus the underlying database tables to customize the data objects to their particular needs. This can include, for example, adding and/or removing one or more fields of a table.

SUMMARY

Implementations of the present disclosure are directed to an extension recommendation system for recommending extensions to applications. More particularly, implementations of the present disclosure are directed to an extension recommendation system that scans application data to identify potential extension points and selectively calls a set of extension-generators to enhance data objects with correctly typed field extensions. In some implementations, the extension recommendation system provides extension plug-ins that automate data entry. In some implementations, the extension recommendation system enables generated extensions to be implemented in a supervised mode to validate usefulness until sufficient confidence has been established, and subsequent activation for automatic system-wide execution.

In some implementations, actions include querying metadata of data objects in a set of data objects to determine presence of one or more of a generic text field and an attachment field to define a sub-set of data objects, each data object in the sub-set of data objects including one or more of a generic text field and an attachment field, and, for each data object in the sub-set of data objects, processing historical data of a data object to identify a set of data types, the historical data stored within a field of a table of a database system, providing a recommendation for a first extension corresponding to a first data type in the set of data types, and receiving user input indicating acceptance of the recommendation for the first extension and, in response, automatically providing extension code that is executable to add a field extension to the table and to modify a user interface (UI) of an application for input of values corresponding to the first data type, and executing the extension code to deploy the extension and to modify the UI. Other implementations of this aspect include corresponding systems, apparatus, and computer programs, configured to perform the actions of the methods, encoded on computer storage devices.

These and other implementations can each optionally include one or more of the following features: actions further include, in response to receiving user input indicating acceptance of the recommendation for the first extension, determining default values for selective presentation in the UI for the first data type; determining default values includes one or more of providing default values from the historical data and extracting default values from one or more attached documents; determining default values includes initiating a machine learning (ML) platform to provide a ML model that is trained to generate the default values; actions further include determining a frequency of data values corresponding to the first data type within the field of the table, wherein providing a recommendation for a first extension corresponding to a first data type in the set of data types is executed in response to determining that the frequency at least meets a threshold frequency; actions further include determining a frequency of data values corresponding to a second data type within the historical data, and determining to forego providing a recommendation for a second extension corresponding to the second data type in response to determining that the frequency fails to meet a threshold frequency; and actions further include determining an accuracy associated with the first extension based on one or more of frequency of use of the first extension and acceptance of default values for the first extension, and selectively alerting a user to one of updating and removing the first extension based on the accuracy.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to an extension recommendation system for recommending extensions to applications. More particularly, implementations of the present disclosure are directed to an extension recommendation system that scans application data to identify potential extension points and selectively calls a set of extension-generators to enhance data objects with correctly typed field extensions. In some implementations, the extension recommendation system provides extension plug-ins that automate data entry. In some implementations, the extension recommendation system enables generated extensions to be executed in a supervised mode to validate usefulness until sufficient confidence has been established, and subsequent activation for automatic system-wide execution.

Implementations can include actions of querying metadata of data objects in a set of data objects to determine presence of one or more of a generic text field and an attachment field to define a sub-set of data objects, each data object in the sub-set of data objects including one or more of a generic text field and an attachment field, and, for each data object in the sub-set of data objects, processing historical data of a data object to identify a set of data types, the historical data stored within a field of a table of a database system, providing a recommendation for a first extension corresponding to a first data type in the set of data types, and receiving user input indicating acceptance of the recommendation for the first extension and, in response, automatically providing extension code that is executable to add a field extension to the table and to modify a user interface (UI) of an application for input of values corresponding to the first data type, and executing the extension code to deploy the extension and to modify the UI.

As used herein, the terms low-code and no-code generally refer to software development platforms and/or tools that are targeted at users with little or no development experience (e.g., referred to as citizen developers, or low-code (no-code) developers). Another target of such platforms and/or tools can include more experienced developers having shorter timeframes for development (e.g., low-code (no-code) enabling developers to develop more quickly). Here, low-code can refer to development requiring some level of coding experience, while no-code can refer to development with no coding experience. In the context of implementations of the present disclosure, low-code (no-code) extension developers generally refers to developers of extensions to applications, who have limited development experience and/or are under tight timeframes to develop application extensions. While the present disclosure references low-code developers and/or no-code developers, it is appreciated that implementations of the present disclosure can be realized for the benefit of more sophisticated developers and/or developers having more generous timeframes to develop application extensions.

As used herein, the term key-user (or key user) generally refers to a user that is knowledgeable about processes that are embodied within and/or are executed using applications. For example, a key-user has extensive knowledge of the impact that processes (e.g., fully or partially software-executed) and/or changes to processes will have on operations of an enterprise. Accordingly, and in the context of the present disclosure, a key-user has an important role in evaluating and/or implementing extensions to applications. In some instances, however, a key-user may have little to no development experience and hence, can be considered to be a citizen developers, or a low-code (no-code) developer.

To provide further context for implementations of the present disclosure, and as introduced above, software systems can be provisioned by software vendors to enable enterprises to conduct operations. Software systems can include various applications that provide functionality for execution of enterprise operations. Software vendors often provide software systems as off-premise applications that are executed in cloud computing environments, which can be referred to as cloud-based applications (e.g., applications provided in the so-called "Software-as-Service" (SaaS) paradigm). In some instances, software systems can include or operate in association with a database system. Applications can be provided in an application layer that overlies a database system and enables interactions with the database system (e.g., reading data, writing data, manipulating data). In general, database systems provide for storage, organization, and analysis of large volumes of data.

In some instances, software vendors seek to provide software applications with some level of configuration and enable customers (e.g., enterprises) to customize vendor-provided software (e.g., add custom code, modify existing code, use application programming interfaces (APIs) that are not declared as "release stable"), and/or data objects. For example, software vendors can provide standard data objects in deployed software systems, which can be populated with data that is stored in one or more database tables within a database system that an application interacts with. In some instances, customers seek to extend the data objects, and thus the underlying database tables to customize the data objects to their particular needs. This can include, for example, adding and/or removing one or more fields of a table.

More recently, low-code/no-code and key-user extensibility have become increasingly important for cloud-based applications (i.e., SaaS offerings) as they allow non-developers to adjust the application to their individual needs more closely than configurations alone would make possible. For example, a key-user might have little to no coding or development experience. In the context of the present disclosure, low-code/no-code eases the process of creating extensions. In general, key-user extensibility and low-code/no-code utilize stable interfaces and extension points to reduce follow-up lifecycle costs during deployment of code (e.g., new code, modified code).

When an enterprise adopts a cloud-based application, the enterprise seeks to identify extensions to an application to customize the application to the particular needs of the enterprise. Further, for an extension, the enterprise seeks to determine whether the extension is useful to a set of users or to only a sub-set of users within the enterprise. Similarly, low-code/no-code tools are themselves feature rich offerings with a broad spectrum of functionality offered through services and libraries. This can require a certain learning curve, especially as these offerings continuously grow. Thus, a citizen developer (e.g., low-code/no-code developer) has to be aware of which kind of extensions can be built and implemented in order to take full advantage of the cloud-based application. In some instances, a citizen developer is not supported in the process of identifying a need (or option) for an extension (e.g., in determining whether an extension benefits a single user or is broadly helpful feature), and/or identifying where to extend and how to integrate which existing services (e.g. machine learning) into an extension.

In view of the above context, implementations of the present disclosure provide an extension recommendation system that scans application data to identify potential extension points and selectively calls a set of extension-generators to enhance data objects with correctly typed field extensions. In some implementations, the extension recommendation system provides extension plug-ins that automate data entry. In some implementations, the extension recommendation system enables low-code extension developers to execute the generated extensions in a user supervised mode to validate usefulness until sufficient confidence has been established, and subsequent activation for automatic system-wide execution.

As described in further detail herein, the extension recommendation system analyzes usage and process data of a cloud-based application to identify a set of extension options. The set of extension options is presented to a user (e.g., citizen developer) for approval. In some examples, the extension recommendation system enables the user to fine-tune an extension (e.g., change a user interface (UI) label of a field extension). Because the extension options are based on data analysis, the presented options can be accompanied by statistical information about the potential usefulness based on historic data. In this manner, the extension recommendation system of the present disclosure provides insights about the extension to the user, which would otherwise be unavailable. Collected statistics on usage and relevance guides users more towards managing and optimizing extensions rather than on requirements engineering. In some implementations, the extension recommendation system can proactively generate extension code that enables automation of processes. For example, code can be generated using templates, where a template is selected for the particular extension case and specific values within the template. A template can be provided for each of a particular type of artifact of a programming model (e.g., views, UI definitions). In some examples, the generated extension coding is tested and verified in a controlled manner before being activated for general use (e.g., production use by multiple users).

Accordingly, and as described in further detail herein, implementations of the present disclosure address the following example issues, among others not explicitly addressed herein. In one example, an individual user may want an extension, but first, the user would have to formulate the need for an extension, then it needs to be determined whether the extension is only useful for the individual user or more broadly useful for other users. That is, an extension that only benefits a single user, might not be an extension that should be implemented. Implementations of the present disclosure enable this evaluation in a seamless and efficient manner. In another example, limited knowledge about the infrastructure underlying the cloud-based application provides a barrier to users in determining, which extensions are feasible. In some instances, the infrastructure underlying the cloud-based application is more powerful than the user might be aware of or even expect (e.g., infrastructure employing intelligent machine learning (ML) capabilities). Implementations of the present disclosure address this issue enabling extension developers to take full advantage of the available possibilities.

In another example, it can be impractical for users (extension developers) to determine which types of extensions are possible. For example, a user might be unaware that an extension is possible for a process or a UI. Implementations of the present disclosure address this issue informing extension developers of available types of extensions for a given application. In still another example, in instances where an extension is available, users (e.g., citizen developers) might be unable to generate the code required to implement the extension. Implementations of the present disclosure also address this issue by generating code based on information gathered with ML capabilities. This further lowers the required knowledge to build useful application extensions, and works toward an ultimate goal of not expose any (generated) code to the citizen developer, making it a seemingly no-code experience.

Implementations of the present disclosure are described in further detail with reference to a non-limiting example that includes extending a database table with a field extension. For example, data can be analyzed, and it can be determined that particular information (e.g., website address) regarding a customer is frequently entered in a free-text field of a table. The type of information can be determined, and an extension recommendation can be made to extend the table to include a column that is specific to the information. It is contemplated, however, that implementations of the present disclosure can be realized for any appropriate type of extension.

Figure 1:
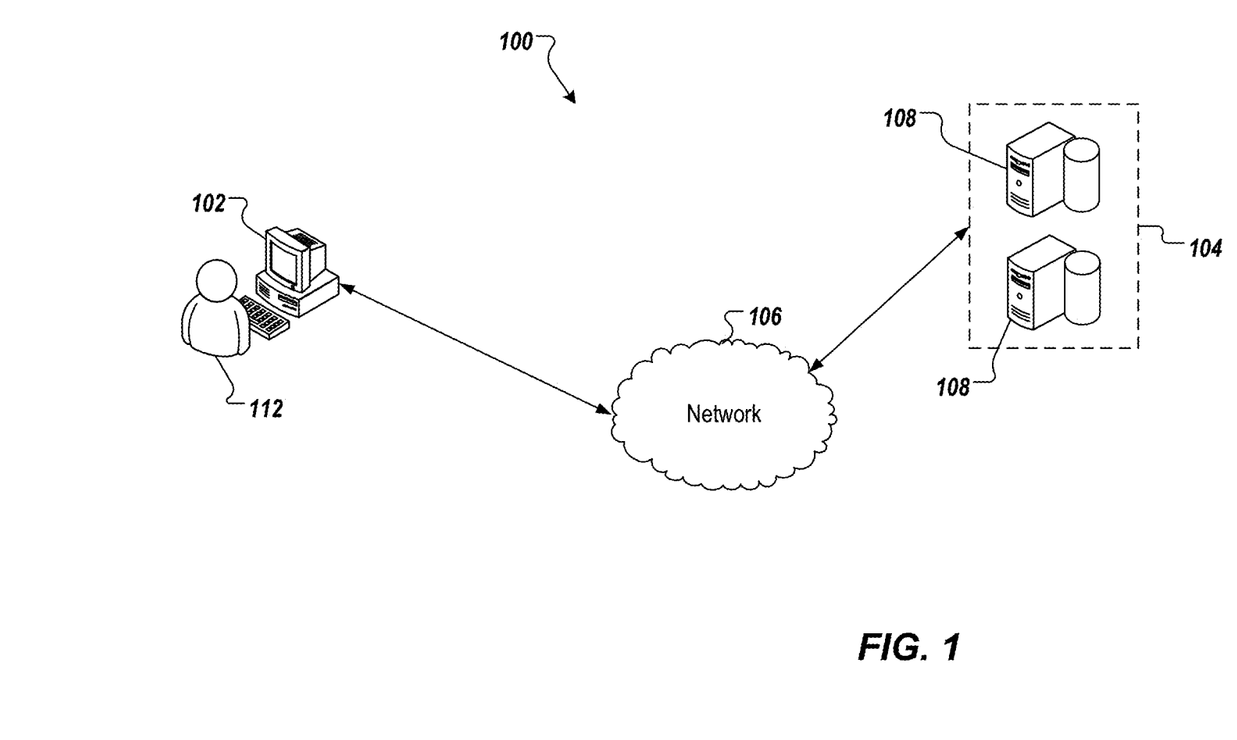
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to, a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 104 can host an extension recommendation system. As described in further detail herein, the extension recommendation system scans application data to identify potential extension points and selectively calls a set of extension-generators to enhance data objects with correctly typed field extensions.

Figure 2:
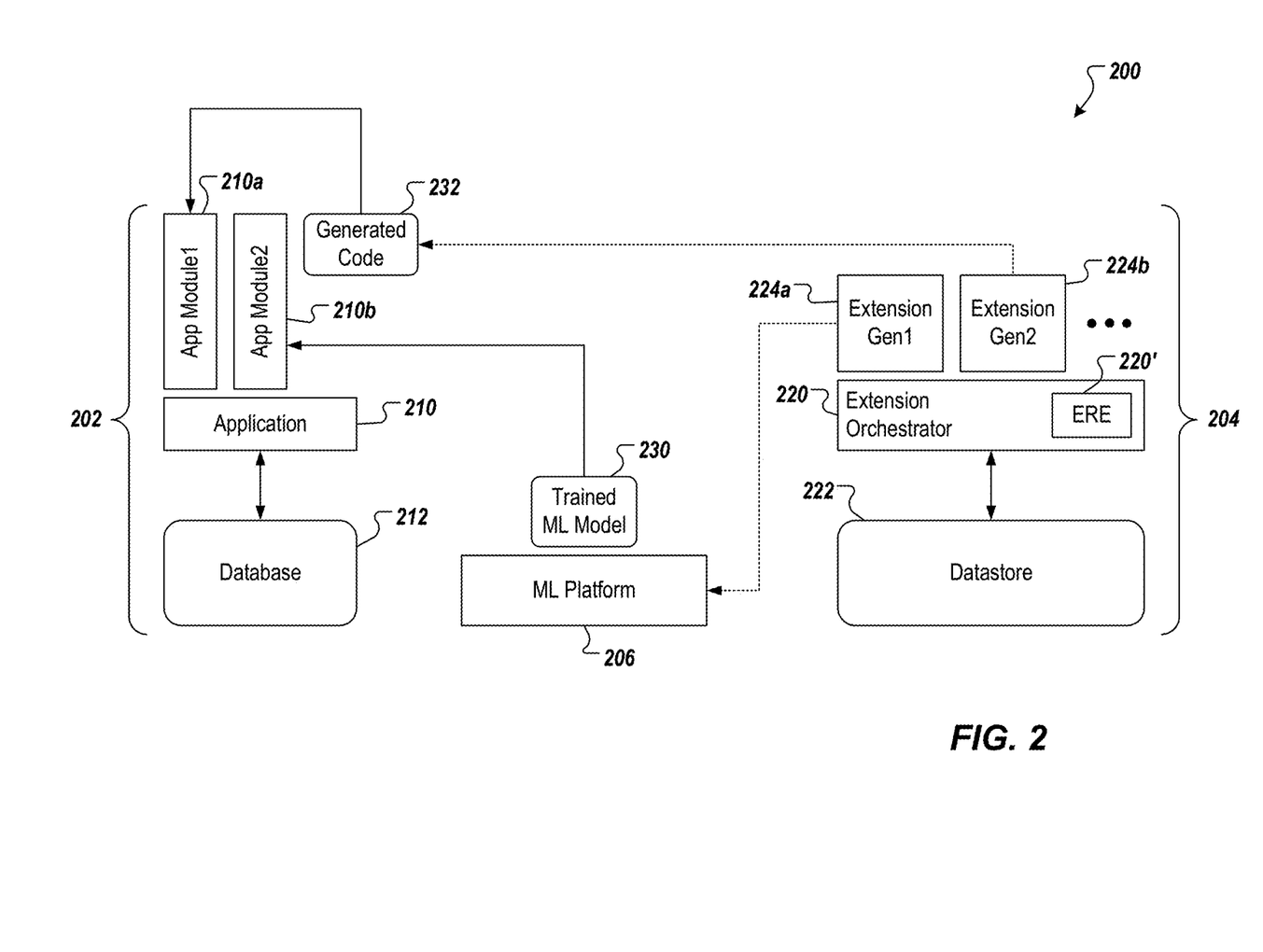
FIG. 2 depicts an example conceptual architecture in accordance with implementations of the present disclosure.

FIG. 2 depicts an example conceptual architecture 200 in accordance with implementations of the present disclosure. In the depicted example, the example conceptual architecture 200 includes a cloud-based system 202 and an extension recommendation system 204. In the example of FIG. 2, the example conceptual architecture 200 also includes a ML platform 206.

The cloud-based system 202 includes an application 210 that interacts with a database 212. For example, the application 210 is executed on a server (e.g., an application server) and interacts with the database 212. The application includes application modules 210a, 210b. Although the example of FIG. 2 depicts two application modules, it is contemplated that implementations of the present disclosure can be realized with applications having any appropriate number of application modules. In some examples, each application module 210a, 210b provides respective functionality of the application 210. In the example of FIG. 2, the extension recommendation system 204 includes an extension orchestrator 220, a datastore 222, and a set of extension generators 224a, 224b. In some examples, the extension recommendation system 204 includes an extension recommendation engine (ERE) 220'. In the example of FIG. 2, the ERE 220' is provided within the extension orchestrator 220.

In accordance with implementations of the present disclosure, and as described in further detail herein, the ERE 220' identifies extensions that are available for the application 210 (e.g., any extensions available for the application modules 210a, 210b). In some implementations, one or more of the extension generators 224a, 224b evaluate data, select an extension generation process (e.g., algorithm) based on the evaluations, and generate an extension. In some examples, a set of extension options and related statistics (e.g., how frequently used) can be presented to a user, who can determine whether the extension is to be generated. In some examples, an editor can be provided that enables the user to create their own queries, which can be embedded in one or more of the extension generators 224a, 224b. In some implementations, the extension orchestrator 220 orchestrates deployment of the generated extension(s) and collects statistics on the use of the extension(s) within the application 210. In some examples, the extension orchestrator 220 presents extension statistics to the user, who can determine whether to keep or change the extension. In some examples, the extension orchestrator 220 collects statistics of usage for all generated extensions and evaluates accuracy of each. If accuracy drops below a threshold, the extension orchestrator 220 can trigger an extension generator to create new version of the extension. In some examples, the extension orchestrator can send statistics to the vendor (i.e., the vendor that provides the application 210). The developer of the code executed as an extension generator can improve and/or add queries to the extension generator.

In further detail, the ERE 220' is configured to execute queries to determine a working set for each of the extension generators 224a, 224b. That is, for example, the ERE 220' queries the data store 222 to determine the working sets. In some examples, a working set includes a set of data objects (DOs) (also referred to as business objects (BOs)) and a set of extension generators. The combinations of DOs and extension generators can be a relatively large working set, which provides broad coverage over the entirety of the application 210. In some examples, to optimize and minimize resource consumption, the ERE 220' identifies, for example, which DOs have the most instances and/or which input UIs of respective DOs are called most frequently across all instances of the application 210 (i.e., instances of the application 210 used by other enterprises). In this manner, DOs can be ranked (e.g., based on number of instances and/or input UI call frequency), and a top X (e.g., top 10) DOs can be initially addressed. In some examples, the ERE 220' includes a persistency that stores, which extension generator has been called for which DO to not re-run ERE unintendedly, only if accuracy drops, a new version was applied, or the user triggers the run. In some implementations, the ERE 220' is configured with read-only access to the application database and meta data store.

In some implementations, each extension generator 224a, 224b can be of a respective type of extension generator. Example types of extension generators can include, without limitation, a field extension generator, a default-value proposal generator for structured data sources, and a default-value proposal generator for unstructured data sources. For the field extension generator, DOs with a generic text field are identified. This is done by reading metadata of the DOs, and when, for example, "comment" is contained in the metadata description of the DO fields, the DO is a candidate for further analysis and thus the identified DO with the text field is added to the working set. For example, module=field extension generator, DO="business partner," field="comment." As another example, module=field extension generator, DO="purchase order," field="note." For the default-value proposal generator using attachments, described in further detail herein, all DOs with attachments are candidates. The relevant fields are those present on the UI to create an instance of the relevant DO. For example, module=default-value proposal generator using attachments, DO="invoice," fields=(<all input fields on the create invoice UI> like "business partner name", "address" . . . ).

With regard to field extensions, one or more field extensions are identified from historical DOs (e.g., DOs used by various enterprises). In some examples, each field extension is proposed to the user for acceptance or rejection. In some examples, proposal of a field extension can also indicate the proposed field type and input validation and provide examples of historic data in the current field and associated statistics (e.g., how often the value occurred in the field). In some examples, the user can be asked for a name for the field extension (e.g., which can be used for UI text). In response to user acceptance of the field extension, the field extension is added to the respective table in the database and the UI, through which data values are received, is revised to include a respective input field and validation logic. In some examples, the application executes for some time and an analysis of the field extension is performed. For example, the analysis can be used to determine whether the field extension is used by the users as intended. As another example, the analysis can be used to determine whether the free-text field that had previously been used no longer contains this type of data (e.g., an field extension is generated to for e-mail address, but users continue to put email addresses in the comment field, indicating that users are not using the field extension). In some examples, the user is presented with a confidence level of the field extension. The user can be asked whether historic data is to be migrated from the free-text field to the field extension. If the user agrees, the data from the free-text field is replicated in or migrated to the field extension (e.g., email addresses in the comment field are replicated in/migrated to the field extension).

In further detail, the field extension generator identifies opportunity for an field extension based on an analysis of free-text fields of tables. Example free-text fields can include description, comment, remarks, notes, and the like. In some examples, the field extension that is generated is a more specific field with a precise data type and single usage pattern. This elevates data quality and enables further extensions optimizing processes by leveraging this additional metadata-enhanced object field. In some examples, the ERE 220' reads the definitions of each DO in the system and identifies those DOs, which have one or more free-text fields (e.g., a comment field). In some examples, this can be done by scanning for fields of a certain type (e.g., scan DOs for fields defined by data elements containing *comment* in the data element name or short text name). This scanning results in a list of DO types and respective free-text fields that can be compared for matches. In some examples, the field extension generator is called for each DO type, which it has not yet been called for.

In further detail, the field extension generator is called with a DO name and free-text field name. The field extension generator reads the content in the data store for the field values and applies one or more regular expressions (regex) to identify different value types. Example value types include, without limitation, e-mail address, time, date, URL, mailing address, telephone number, and value-added tax (VAT) number. Examples of regexes are publicly available and any appropriate regex can be used with implementations of the present disclosure. In some examples, the field values are parsed using the regular expressions to determine whether the field content contains certain value types relatively often. For example, a frequency of value types can be determined (e.g., percentage of occurrences of a value type in entries to the free-text field) and can be compared to a threshold frequency (e.g., at least 40% of the fields contain an e-mail address, at least 40% of the fields contain a date-time). The field extension generator recommends creating an field extension of the specified type (e.g. a text field, a date-time field) and potentially even a content verification parser (with the regular expression that had been used to determine the field type). The field and value types are proposed to the citizen developer. If the extension developer accepts, the generator generates the field extension.

With regard to the default-value proposal generator for structured data sources, here, data is transferred from a UI and/or DO to populate input fields with default values. In this manner, manual copy/paste with all of the inherent inefficiencies and potential for inaccuracy is avoided. This can be done for fields defined by the vendor, but also for field extensions implemented by various enterprises (i.e., other enterprises that also use the cloud-based application). In some examples, for a particular DO and/or for any DO that is related to the particular DO (e.g., by a foreign-key-association) any field extension is identified. In some examples, for an identified field extension, a default value can be computed out of historic data of the value. For example, and as described in further detail herein, default values can be computed by SQL query generators or using ML.

In further detail, the default-value proposal generator for structured data sources reads predecessor DOs along a process flow or previous instances of a DO related to the same master DO. More particularly, the default-value proposal generator for structured data sources generates data population rules that can be used to fill input fields with default values that are suggested from related DOs. In some examples, fields are populated with data from other DOs that may have been maintained in other UIs by various users. For example, and as introduced above, common object field data types are read directly from related DOs, such as a predecessor DO along a process flow. As another example, the common object field data types are read from historic data of the same DO type. In some examples, the ERE 220' scans the UI definitions of input screens for fields with, for example, code fetchDefaultValue (or similar routines, potentially coding standards define the name for a certain programming language or development project). In some examples, the ERE 220' determines the DO type (and field name) related to the UI input screen. In some examples, this results in a list of DO types and the desired-input-fields and the fields of related predecessor DOs that can be compared for matches. In some examples, this results in a list of DO types and the desired-input-fields and referenced master DOs that can group DO instances that are related to the same master DO instance, such that DO fields of a group can be compared for matches. In some examples, different default-value-proposal generators are called, one for each DO type.

As noted above, default values can be computed by SQL query generators. In some examples, query templates are provided for each DO and field. For example, a first query template (Q1) compares data in a field-to-be-filled (f1) with the data in the field-to-be-taken-as-input-default (f2), and a second query template (Q2) queries the content of f2, when f1 is to be pre-filled given a certain key and set of attributes.

By way of a non-limiting example, two DOs related by three key fields k1, k2, k3 and the desired fields f1 and f2 can be considered. The following example query returns a table with the key and the desired fields, so they can be compared.

```
select t1.k1, t1.k2, t1.k3,
    t1.f1, t2.f2
from bo1_table as t1
join bo2_table as t2
on t1.k1 = t2.k1 and t1.k2 = t2.k2 and t1.k3 = t2.k3
where t1.f3 = 'some constraint' and t1.f4 = 'some other constraint'
```

An example Q1, which gives the number of equal and non-equal values that can be taken as a statistical correlation indicator can be provided as:

```
select
    (case when (t1.f1 = t2.f2)
        then cast (1 as integer)
        else cast (0 as integer)
        end) as equality,
        count(*)
from bo1_table as t1
    join bo2_table as t2
    on t1.k1 = t2.k1 and t1.k2 = t2.k2 and t1.k3 = t2.k3
    where t1.f3 = 'some constraint' and t1.f4 = 'some other constraint'
group by
(case when (t1.f1 = t2.f2)
    then cast (1 as integer)
    else cast (0 as integer)
    end)
```

An example Q2 to select f2 for a given key to pre-fill f1 (giving the most frequent value of f2) can be provided as:

```
select top 1 f2, count(*)
from bo2_table
    where t1.f3 = 'some constraint' and t1.f4 = 'some other
constraint'
        and k1 = 'bo1_table-key-value1'
        and k2 = 'bo1_table-key-value2'
        and k3 = 'bo1_table-key-value3'
group by f2
order by count (*) desc
```

Being more generic, the field of the DO can be place holder in the query template and the actual set of fields in DO are generated into the query template resulting in a set of query statements to analyze the content and later to query the content. For example, an example Q1, which gives the number of equal and non-equal values that can be taken as a statistical correlation indicator can be provided as:

```
select
    (case when (t1.<place-holder-f1> = t2.<place-holder-f2>)
    then cast (1 as integer)
    else cast (0 as integer)
    end) as equality,
    count(*)
from bo1_table as t1
    join bo2_table as t2
        on t1.k1 = t2.k1 and t1.k2 = t2.k2 and t1.k3 = t2.k3
    where t1.f3 = 'some constraint' and t1.f4 = 'some other
constraint'
group by
(case when (t1.<place-holder-f1> = t2.<place-holder-f2>)
    then cast (1 as integer)
    else cast (0 as integer)
    end)
```

An example Q2 to select f2 for a given key to pre-fill f1 (returning the most frequent value of f2 for the certain key and where clause) can be provided as:

```
select top 1 <place-holder-f2>, count (*)
from bo2_table
    where t1.f3 = 'some constraint' and t1.f4 = 'some other
constraint'
        and k1 = 'bo1_table-key-value1'
        and k2 = 'bo1_table-key-value2'
        and k3 = 'bo1_table-key-value3'
group by <place-holder-f2>
order by count (*) desc
```

In some implementations, the first query template (Q1) to assess the content is executed by the ERE resulting in a statistical correlation indicator (e.g., a likelihood two values are equal based on identical key values). In some examples, for each field, the ERE executes different queries and selects the query with the highest correlation indicator. If this indicator is above a certain threshold (e.g., 90%), the second query template (Q2) to select the input value for an input field is generated into a code module. This code module is suggested for activation to user. If the user accepts, the code module is deployed by the ERE and configured to be used by the UI to pre-fill the input value of f1 reading from f2. In some examples, attention of the users is directed to newly proposed default values (e.g., by highlighting), to encourage manual verification of correctness. This is monitored by recording how often the suggested value is taken or is overwritten. In some examples, accuracy of the default value is determined. If the accuracy reaches desired limit, highlighting of the proposed default is discontinued, indicating to users that from now on the default values can be trusted. If accuracy falls below a certain limit, recommend adjustment or deactivation of generated extension to the user.

As noted above, default values can be computed using ML, such as provided with a ML platform (e.g., the ML platform 206 of FIG. 2). An example ML platform includes AutoML (part of SAP Data Intelligence) provided by SAP AG of Walldorf, Germany. In some examples, the ML platform automates the ML pipeline of data preparation, feature engineering, feature selection, training of MLs, and tuning of hyperparameters. In accordance with implementations of the present disclosure, historic data from a DO and/or a DO related by a foreign key attribute (FKA) is/are selected and a field is specified, for which the ML platform is to propose a value for. The ML platform processes the data set to identify a ML model where training returns very good accuracy (e.g., accuracy meeting a threshold accuracy). The ML model can be used to provide default values. For example, the ML model is deployed in an infrastructure for inference and the application is to be configured and extended to call the ML model to obtain values (e.g., as depicted in FIG. 2, the application 210 (the application modules 210b) calls the ML model 230 for data values).

In further detail, for an input field, related attributes of table fields, same table or other table by FKA are determined (e.g., by the ERE 220') and a history of content for the field (label) and the related fields (features) is read. This can be performed using a query generated from SQL templates, for example, as described herein. The ML platform is called to process the data set (e.g., as depicted in FIG. 2, the extension generator 224a calls the ML platform 206, which processes the data set as training data from a ML model). If the ML platform provides a ML model with sufficient accuracy, use of the ML model for generating default values suggest using the model to generate the default value to the user (e.g., citizen developer). If the user accepts, an extension is implemented and default values are provided by the ML model. In some examples, at least initially, attention can be directed to proposed default values (e.g., by highlighting) to encourage manual verification of correctness. How often the suggested default value is adopted or overwritten can be monitored and can be used as a basis to report accuracy back to the extension orchestrator (e.g., the extension orchestrator 220 of FIG. 2). If the accuracy achieves a threshold accuracy (e.g. default values are adopted at least 75% of the time), highlighting of the proposed default value can be deactivated, indicating to users that from now on they can trust the proposed default values (but, user can still override). If accuracy falls below the threshold accuracy, adjustment or deactivation of the extension can be recommended to the user.

In some implementations, an extension generator (e.g., the extension generator 224a of FIG. 2) at least partially coordinates the ML activities. For example, the extension generator can identify an input field on UI without computed default value, defining the field "input-field," and can determine other key fields and input fields on the same UI, defining the set "key+attribute-field-set-1," for example. In some examples, the extension generator can determine the table related to the input field "input-field" (e.g., based on FKA) defining "table-input-field," and can determine fields at the same table as "table-input-field" that are related to "input-field" (e.g., which have the same key) to defining "table-key+attribute-field-set-2." In some examples, the extension generator can determine the tables related to "key+attribute-field-set-1" and determine additional fields at the tables to define "table-key+attribute-field-set-1." In some examples, the extension generator can read (e.g., by executing a query) the existing (historic) values of the fields from the table related to set "table-key+attribute-field-set-1" and/or "table-key+attribute-field-set-2" the sets can be joined on common key values, giving the "historic-input-field-values," and can provide "historic-input-field-values" as features and the values for field "table-input-field" as labels to the ML platform, which is called to run the process and determine a suitable type of ML model and training pipeline for the ML model.

In some implementations, the extension generator can assess the accuracy of the ML model to determine whether the ML model is sufficiently accurate. For example, the ML platform can provide an accuracy score resulting from the training process to the extension generator and the extension generator can compare the accuracy score to a threshold accuracy. In some examples, if the ML model is sufficiently accurate, the extension generator can generate code to: run data extraction (reading the subset of fields used by auto-ml from "table-key+attribute-field-set-1" and "table-key+attribute-field-set-2") and training the ML model regularly using the ML platform, deploy the ML model for inference by the application, and call the ML model from the application to pre-fill input field.

In some examples, the default-value proposal generator for unstructured data sources is used to generate data extraction rules that can be used to populate DO fields with values from unstructured data (e.g., a scanned document image). In some examples, fields in the UI are identified, which do not yet provide computed default values and to generate default values for an input screen, when at the input screen also a document is uploaded as attachment (e.g., the document is an invoice that contains information about address, telephone number, order number, date, amount, and the like). In some examples, the document can be processed through a document text extraction ML algorithm to extract data, and the input fields can be pre-populated with these values. In some examples, the user is afforded the option to overwrite values, if the detection was not accurate, for example. For some DOs (e.g., invoices) such functionality might be provided by the standard solution as hard-coded implementation. However, some DOs might lack this automation (e.g., because the attachment field itself was added as an field extension or some of the DO fields to be populated with extracted data are field extensions). In some examples, the ERE 220' scans the definition of all DOs and identifies those with a document attachment. Attachments are analyzed depending on their type (e.g., images are processed with optical character recognition (OCR), unstructured text is tokenized) to identify potential data values that could be transferred to DO fields. Using the programming model artifacts, the ERE 220' determines the UI input screen definition for the DO. The UI input screen definition is scanned for fields from the DO that are displayed together with the attachment upload limiting the set of fields to those visible and changeable on the UI. This results in a list of DOs with their fields accessible by the UI and the document-attachment-field with access paths to content in the unstructured data that can be compared for matches.

In some implementations, a default-value proposal generator for attached documents is provided, which proposes default values from content of documents. In some examples, a call with a DO name and "document attachment" field name is made to identify stored documents (e.g., MS Word, Excel, PDF). In some examples, document attachment fields (this can also include document attachment fields extended by the user) are provided in tables to store documents in the database.

In some implementations, historic data is extracted, which can include, without limitation, attached documents as well as DO fields and attribute fields of tables, which UIs write to. A document text extraction routine (e.g., a ML service to detect text elements in documents) is executed over the documents to extract text data. In some examples, an attached document can first be processed using optical character recognition (OCR) (e.g., PDF, image file). In some examples, document patterns can be identified. For example, documents can be grouped (clustered) into groups of similar documents. In some examples, attributes are extracted from documents, and are stored as a data set with the historic data using a related key. For example, data that is extracted is provided with the item-name and item-value (e.g., invoice-nr, amount shipping, etc.). In some examples, attribute matching is executed to determine which attribute field value in a table matches an attribute extracted from the document. For example, for each document cluster, it can be determined whether attribute pairs "historic ↔ extracted" always match with the same extracted attribute (e.g. always with the address "from-field," the invoice number, telephone number, etc.).

In some examples, attribute matching is assessed to determine an accuracy of the matches. For attributes with a sufficient accuracy (e.g., an accuracy exceeding a threshold accuracy), creating an extension for default-value proposals of the identified fields based on document attachments can be suggested. If the user (e.g., citizen developer) accepts, the ML model is provided to extract attributes from documents (e.g., (transfer learning) train with document clusters (if required)). Further, code in the UI is provided (e.g., call in UI routine fetchDefaultValue for the respective fields), which is executed to, upon attaching document into the UI, call a ML service to scan the document, receive extracted attributes, and pre-fill (empty) fields in the UI with extracted attributes. A user interfacing with the UI can accept or override the suggested data values.

As discussed above, the extension can be implemented and user attention can at least initially be directed to proposed default values (e.g., by highlighting) to encourage manual verification of correctness. For example, for each UI, to which a document is attached and input fields are pre-filled, it can be recorded whether the suggested attribute is taken over or overwritten, accuracy of proposed data values is regularly determined, and accuracy is reported to the extension orchestrator. If accuracy is sufficient, highlighting of proposed default values can be deactivated to indicate that the proposed data values can be trusted. If the accuracy falls below a certain limit, adjustment or deactivation of the generated extension can be recommended.

Implementations of the present disclosure are illustrated with reference to non-limiting, example use cases. A first example use case is directed to adding a field extension to a DO associated with a partner entity (e.g., a customer of an enterprise). A second example use case is directed to default values for a field extension based on historical interactions with an entity (e.g., a customer of an enterprise). A third example use case is directed to defaulting a field in an incident record with a value from a related product registration. A fourth example use case is directed to defaulting material master fields with values extracted from an attachment.

With regard to the first example use case, a cloud-based application can include an input mask for "customer data" (or "business partner"). The input mask reflects the persistency and has a set of fields for "name," "street," "zip and town," "telephone number," and "email address," as well as a free-text field, in which a user can write additional information regarding the customer. For example, a UI can be provided, which includes input elements enabling users to input information (e.g., a text box enabling users to input text), each input element corresponding to one or more fields in the set of fields. In some instances, when there is no dedicated field for certain information, users will enter such information in the free-text field. For example, because the set of fields is absent input for a website address (i.e., URL) or a social network identifier (SNID) to be entered, users might type the website address and/or the SNID of the customer in the free-text field. Because the website address and/or the SNID is input to the free-text field, it is difficult to make use of in a business process.

In accordance with implementations of the present disclosure, the extension recommendation system (e.g., the ERE) scans content of the free-text field and determines that, the free-text field contains a website address with a first frequency and SNID with a second frequency. For example, the extension recommendation system can scan the content of the free-text fields of a set of customer DOs using a URL regex and a SNID regex, to determine a first sub-set of customer DOs that each include a URL in the respective free-text field and a second sub-set of customer DOs that each include a SNID in the respective free-text field. In some examples, the first sub-set and the second sub-set overlap (e.g., some free-text fields include both a URL and a SNID). A first frequency is determined representing a relative number of occurrence of a URL in the free-text field (e.g., the first frequency being a ratio (percentage) of the number of DO in the first sub-set of DOs to the number of DOs in the set of DOs). A second frequency is determined representing a relative number of occurrence of a SNID in the free-text field (e.g., the second frequency being a ratio (percentage) of the number of DO in the second sub-set of DOs to the number of DOs in the set of DOs).

In some examples, if a frequency meets or exceeds a threshold frequency (e.g., 20%), it can be determined to recommend that a field extension be added. Continuing with the non-limiting example, it can be determined that the first frequency exceeds the threshold frequency and that the second frequency does not exceed the threshold frequency. In response, the extension recommendation system provides a proposal to add a URL field to the "customer data" and provides input validation (e.g., checking URL conventions). A user (e.g., citizen developer) is presented with the proposed field, the type, and the first frequency (estimating how often it would be used). In some examples, the user can also be presented with example content (e.g., website addresses determined from the free-text fields).

The user can accept the proposal or reject the proposal. In some examples, if the user accepts the proposal, the user can provide a label for the UI element that will be created to enable input of the data. For example, the extension recommendation system can propose a label (e.g., URL) and the user can either accept the proposed label or edit the label (e.g., delete URL and input Customer Website). The field extension can be deployed for production use. For example, and as described herein, the field extension (e.g., URL field) is added to a corresponding table and the UI is updated to include the input element (e.g., labeled as Customer Website). After some period of time (e.g., week, month) or periodically (e.g., each week, each month), the extension recommendation system can provide statistics to the user regarding, for example, how often the field is actually used and/or if the number of URL entries in the free-text field has decreased.

In some examples, after a validation phase, an automatic migration process can be provided to automatically move data from customer DOs from the free-text field and into the generated field extension. For example, after a predetermined period of time (e.g., week, month) the user can accept or reject continued use of the field extension. In some examples, if the user accepts, URLs in free-text fields of customer DOs can be migrated to the field extension (e.g., copied from the free-text field to the field extension, deleted from the free-text field). In some examples, if the user rejects continued use of the field extension, URLs entered to the field extension during the validation phase can be migrated to the free-text field (e.g., copied from the field extension to the free-text field), the field extension can be deleted from the table, and the UI updated to remove the corresponding UI element.

With regard to the second example use case, a Customer Relationship Management (CRM) system is considered, which has a "customer-request-ticket" that is filled in, when a customer call comes in. A dispatcher fills the customer data (e.g., name, company) into the ticket through a UI and adds a "topic" to assign to the correct department for follow-up processing. The idea of the company using the CRM system is to enable the assignment of a "preferred processor" name to the ticket. That is, identify one or more users that should process the ticket. The dispatcher fills this in by searching in historic tickets and, when forwarding to the correct department, the preferred processor can be read from the ticket and assigned directly.

In some examples, it can be determined that a field extension is to be added (e.g., automatically by the extension recommendation system, manually by a user). In response to detecting addition of the field extension, it can be determined that default values are to be generated. In response, an extension generator can execute a query to associate customers to processors. For example, the query can return data indicating that the tickets of the same customer (which is the common master data object those tickets are related to) are processed by the same processor. For example, a query considering historic data with the 10 latest values to match with high percentage with the "preferred processor." In response, a default-value-generation for the field extension is computed and presented to the user. The user may adjust the historic data to the "latest 5," for example, to concentrate only on the most recent values. The extension is generated and deployed. After deployment of the extension, the dispatcher has only to fill the caller name, company, and topic, while the system automatically pre-fills the preferred processor in the UI as a default value based on company name. The dispatcher can accept the default value, or override, as described in further detail herein.

With regard to the third example use case, a company sells products through indirect channels, but would like to establish a closer relationship with their end-customers (e.g., for direct marketing initiatives). Therefore, the company creates an additional service for "product registration," through which end-customers enter contact data together with the serial number of the product they purchased. To incentivize registration, an extended warranty period is granted for registered products. Upon successful registration the product registration service stores the extended end-of-warranty date in the product registration database for the product with the registered serial number.

When a problem with the product occurs, an end-customer can create an incident ticket with the company by, for example, calling a support person. The support person creates an incident record and enters the serial number for the product that has the issue. The support person also checks whether a product registration took place and, if so, copies the extended end-of-warranty date from the product registration database to the corresponding "end of extended warranty" field in the incident record (e.g., a field extension identified and added as described above in the first example use case).

As both the product registration and the incident record have a common reference (the product serial number), the default value generator can identify this correlation and suggest to a user (e.g., citizen developer) to default the end-of-warranty date in newly created incident records with the corresponding value from the product registration database, as these values apparently always match due to the manual process originally introduced. This allows automation of a custom process built on a custom service and custom field extensions without actual development efforts, just by analyzing repetitive user behavior and intelligently generating code that performs the necessary steps autonomously.

With regard to the fourth example use case, a material management system has an input screen to create a new material. A user (e.g., citizen developer) created a field extension for attachments, so a document from a supplier can be attached. During production use, a document can be attached, which is detected. For example, it can be determined that a "document attachment" field contains a PDF file. In response, the material management system calls a "text value extraction service" with existing documents and compares with the attributes of the material-master data object (MM DO) of the system. It determines, that a certain material-supplier-number and material-short-description can be extracted from the document and match the values of fields in the MM DO. The system then generates the code to integrate the text value extraction service when a new attachment is uploaded, and the input fields are populated. The generated extension is suggested to the user, who accepts this proposal and optionally rearranges the order of fields in the UI for creating new materials such that the attachment field is ordered before the material-supplier-number and the material-short-description. In this manner, users do not need to enter these fields manually and benefit from the generated extension.

Figure 3:
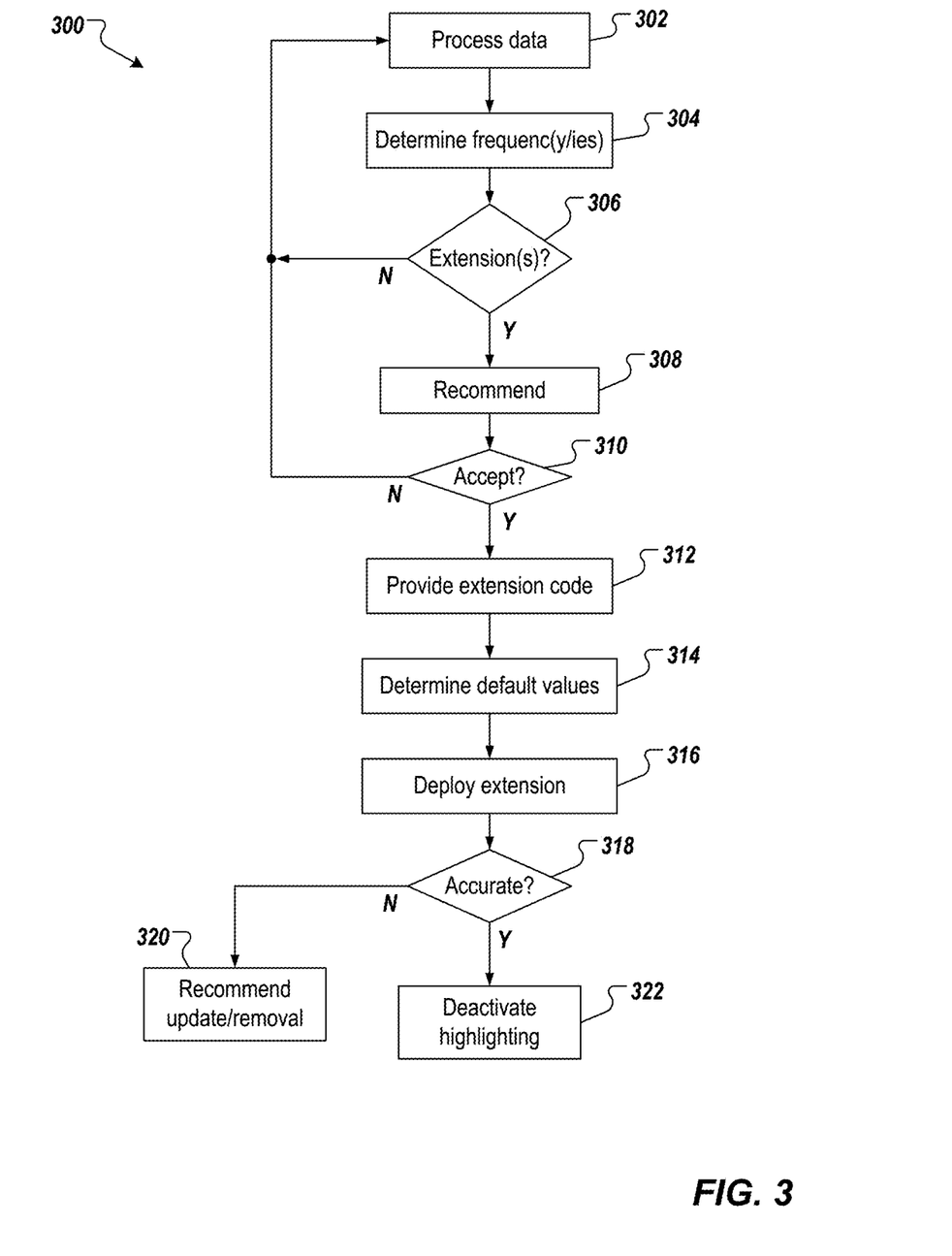
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

Data is processed (302). For example, and as described herein, one or more fields of a database table can be analyzed to determine presence of one or more data types. As described by way of example herein, the extension recommendation system (e.g., the ERE) scans content of a free-text field and determines that, the free-text field contains a website address with a first frequency and SNID with a second frequency. For example, the extension recommendation system can scan the content of the free-text fields of a set of customer DOs using a URL regex and a SNID regex, among other regexes, to determine a first sub-set of customer DOs that each include a URL in the respective free-text field and a second sub-set of customer DOs that each include a SNID in the respective free-text field.

One or more frequencies are determined (304). For example, and as described herein, the number of occurrences of a value of the data type in the field can be determined. As described by way of example herein, a first frequency is determined representing a relative number of occurrence of a URL in the free-text field (e.g., the first frequency being a ratio (percentage) of the number of DO in the first sub-set of DOs to the number of DOs in the set of DOs), and a second frequency is determined representing a relative number of occurrence of a SNID in the free-text field (e.g., the second frequency being a ratio (percentage) of the number of DO in the second sub-set of DOs to the number of DOs in the set of DOs).

It is determined whether at least one extension is to be recommended (306). For example, and as described herein, if a frequency meets or exceeds a threshold frequency, it can be determined to recommend that a field extension be added for a respective data type. If it is determined not to recommend an extension, the example process 300 loops back. If it is determined to recommend at least one extension, a recommendation is provided (308). As described by way of example herein, it can be determined that the first frequency exceeds the threshold frequency and that the second frequency does not exceed the threshold frequency. In response, the extension recommendation system provides a proposal to add a URL field to the "customer data" and provides input validation (e.g., checking URL conventions). A user (e.g., citizen developer) is presented with the proposed field, the type, and the first frequency (estimating how often it would be used). In some examples, the user can also be presented with example content (e.g., website addresses determined from the free-text fields).

It is determined whether a recommendation is accepted (310). For example, and as described herein, the user can accept the proposal or reject the proposal. If a recommendation is not accepted, the example process 300 loops back. If a recommendation is accepted, extension code is provided (312). For example, and as described herein, the user can provide a label for the UI element that will be created to enable input of the data. For example, the extension recommendation system can propose a label (e.g., URL) and the user can either accept the proposed label or edit the label (e.g., delete URL and input Customer Website).

Default values are determined (314). For example, and as described herein, default values can be determined using one or more of a default value proposal generator to transfer data from related DOs, a ML model deployment to generate default values, and a default-value proposal generator to extract default values from an attached document. The extension is deployed (316). For example, and as described herein, the extension code is executed to deploy the field extension and corresponding UI update for production use. For example, and as described herein, the field extension (e.g., URL field) is added to a corresponding table and the UI is updated to include the input element (e.g., labeled as Customer Website). In some examples, default values are displayed in the UI as users interact with the extended application.

It is determined whether an accuracy of the extension is sufficient (318). For example, and as described herein, after some period of time (e.g., week, month) or periodically (e.g., each week, each month), the extension recommendation system can provide statistics to the user regarding, for example, how often the field is actually used, if the number of URL entries in the free-text field has decreased, and/or if default values are being used/overridden. If the accuracy of the extension is insufficient, a recommendation to update or remove the extension is provided (320). If the accuracy of the extension is sufficient, highlighting is deactivated (322). For example, and as described herein, a UI treatment to highlight default values can be deactivated.

In some examples, after the validation phase, an automatic migration process can be provided to automatically move data from customer DOs from the free-text field and into the generated field extension. For example, after a predetermined period of time (e.g., week, month) the user can accept or reject continued use of the field extension. In some examples, if the user accepts, URLs in free-text fields of customer DOs can be migrated to the field extension (e.g., copied from the free-text field to the field extension, deleted from the free-text field). In some examples, if the user rejects continued use of the field extension, URLs entered to the field extension during the validation phase can be migrated to the free-text field (e.g., copied from the field extension to the free-text field), the field extension can be deleted from the table, and the UI updated to remove the corresponding UI element.

Figure 4:
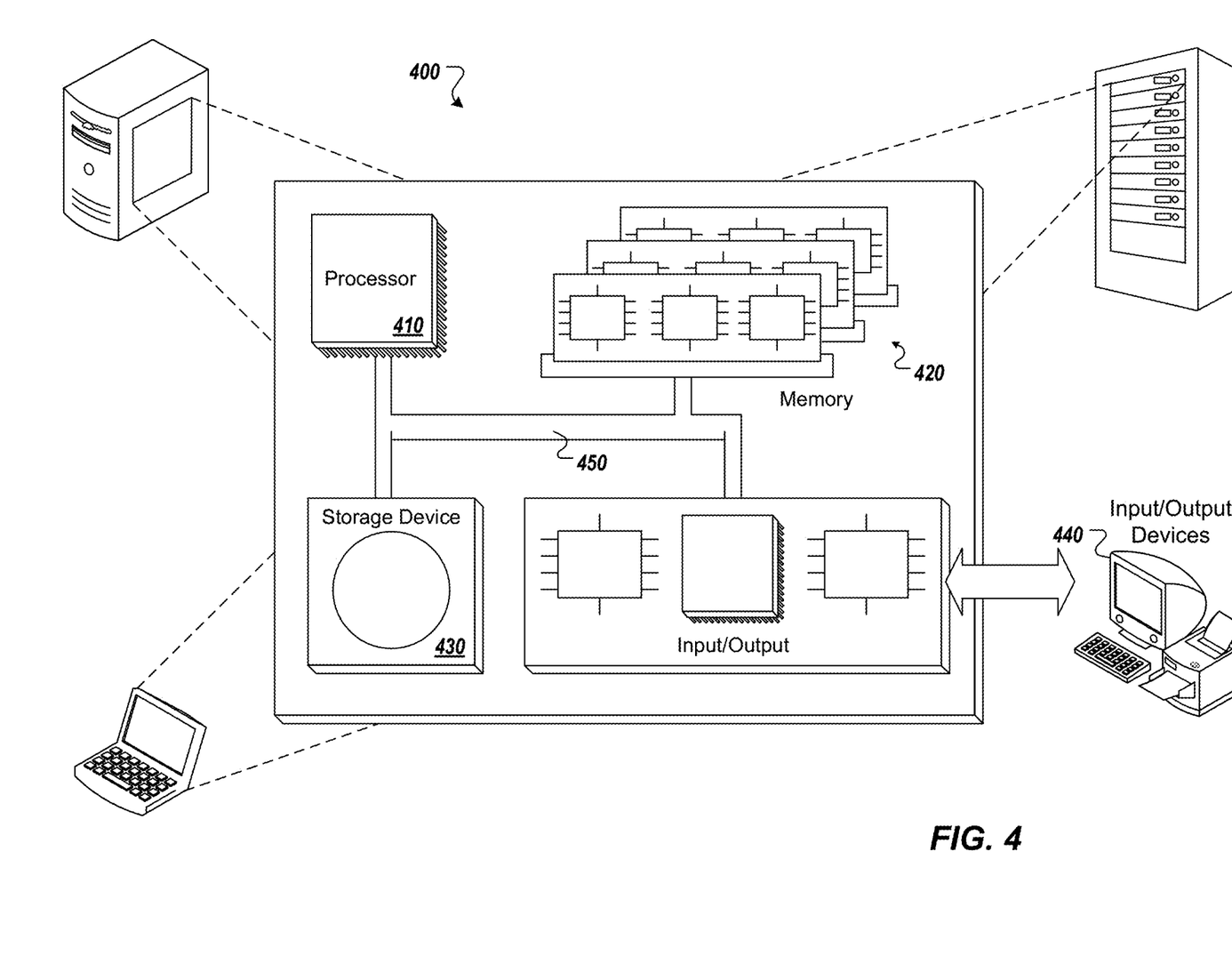
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for one or more of adding extensions and providing default values to extensions in database systems, the method being executed by one or more processors and comprising:
    querying metadata of data objects in a set of data objects to determine presence of one or more of a generic text field and an attachment field within a set of tables stored in the database system, each data object in the set of data objects corresponding to a respective table in the set of tables;
    defining a sub-set of data objects, each data object in the sub-set of data objects comprising one or more of a generic text field and an attachment field within the respective table; and
    for each data object in the sub-set of data objects:
        processing historical data of the data object using at least one regular expression to identify a set of data types, the historical data stored within a field of the respective table stored in the database system,
        in response to determining that a frequency of data of a first data type included in the generic text field exceeds a threshold frequency, displaying to a user a recommendation for a first extension corresponding to a first data type in the set of data types, the first extension comprising adding a column to the respective table, the column representing a field for the first data type that is absent from the respective table, and
        receiving user input from the user, the user input indicating acceptance of the recommendation for the first extension and, in response, automatically:
            providing extension code that is executable to add the field extension to the respective table and to modify a user interface (UI) of an application for input of values corresponding to the first data type, and
            executing the extension code to deploy the extension and to modify the UI.

2. The method of claim 1, further comprising, in response to receiving user input indicating acceptance of the recommendation for the first extension, determining default values for selective presentation in the UI for the first data type.

3. The method of claim 2, wherein determining default values comprises one or more of providing default values from the historical data and extracting default values from one or more attached documents.

4. The method of claim 2, wherein determining default values comprises initiating a machine learning (ML) platform to provide a ML model that is trained to generate the default values.

5. The method of claim 1, further comprising determining a frequency of data values corresponding to the first data type within the field of the table, wherein providing a recommendation for a first extension corresponding to a first data type in the set of data types is executed in response to determining that the frequency at least meets a threshold frequency.

6. The method of claim 1, further comprising:
    determining a frequency of data values corresponding to a second data type within the historical data; and
    determining to forego providing a recommendation for a second extension corresponding to the second data type in response to determining that the frequency fails to meet a threshold frequency.

7. The method of claim 1, further comprising:
    determining an accuracy associated with the first extension based on one or more of frequency of use of the first extension and acceptance of default values for the first extension; and
    selectively alerting a user to one of updating and removing the first extension based on the accuracy.

8. A non-transitory computer-readable storage medium coupled to one or more processors and having instructions stored thereon which, when executed by the one or more processors, cause the one or more processors to perform operations for one or more of adding extensions and providing default values to extensions in database systems, the operations comprising:
    querying metadata of data objects in a set of data objects to determine presence of one or more of a generic text field and an attachment field within a set of tables stored in the database system, each data object in the set of data objects corresponding to a respective table in the set of tables;
    defining a sub-set of data objects, each data object in the sub-set of data objects comprising one or more of a generic text field and an attachment field within the respective table; and
    for each data object in the sub-set of data objects:
        processing historical data of the data object using at least one regular expression to identify a set of data types, the historical data stored within a field of the respective table stored in the database system,
        in response to determining that a frequency of data of a first data type included in the generic text field exceeds a threshold frequency, displaying to a user a recommendation for a first extension corresponding to a first data type in the set of data types, the first extension comprising adding a column to the respective table, the column representing a field for the first data type that is absent from the respective table, and
        receiving user input from the user, the user input indicating acceptance of the recommendation for the first extension and, in response, automatically:
            providing extension code that is executable to add a field extension to the respective table and to modify a user interface (UI) of an application for input of values corresponding to the first data type, and
            executing the extension code to deploy the extension and to modify the UI.

9. The non-transitory computer-readable storage medium of claim 8, wherein operations further comprise, in response to receiving user input indicating acceptance of the recommendation for the first extension, determining default values for selective presentation in the UI for the first data type.

10. The non-transitory computer-readable storage medium of claim 9, wherein determining default values comprises one or more of providing default values from the historical data and extracting default values from one or more attached documents.

11. The non-transitory computer-readable storage medium of claim 9, wherein determining default values comprises initiating a machine learning (ML) platform to provide a ML model that is trained to generate the default values.

12. The non-transitory computer-readable storage medium of claim 8, wherein operations further comprise determining a frequency of data values corresponding to the first data type within the field of the table, wherein providing a recommendation for a first extension corresponding to a first data type in the set of data types is executed in response to determining that the frequency at least meets a threshold frequency.

13. The non-transitory computer-readable storage medium of claim 8, wherein operations further comprise:
    determining a frequency of data values corresponding to a second data type within the historical data; and
    determining to forego providing a recommendation for a second extension corresponding to the second data type in response to determining that the frequency fails to meet a threshold frequency.

14. The non-transitory computer-readable storage medium of claim 8, wherein operations further comprise:
    determining an accuracy associated with the first extension based on one or more of frequency of use of the first extension and acceptance of default values for the first extension; and
    selectively alerting a user to one of updating and removing the first extension based on the accuracy.

15. A system, comprising:
    a computing device; and
    a computer-readable storage device coupled to the computing device and having instructions stored thereon which, when executed by the computing device, cause the computing device to perform operations for one or more of adding extensions and providing default values to extensions in database systems, the operations comprising:
        querying metadata of data objects in a set of data objects to determine presence of one or more of a generic text field and an attachment field within a set of tables stored in the database system, each data object in the set of data objects corresponding to a respective table in the set of tables;
        defining a sub-set of data objects, each data object in the sub-set of data objects comprising one or more of a generic text field and an attachment field within the respective table; and
        for each data object in the sub-set of data objects:
            processing historical data of the data object using at least one regular expression to identify a set of data types, the historical data stored within a field of the respective table stored in the database system,
            in response to determining that a frequency of data of a first data type included in the generic text field exceeds a threshold frequency, displaying to a user a recommendation for a first extension corresponding to a first data type in the set of data types, the first extension comprising adding a column to the respective table, the column representing a field for the first data type that is absent from the respective table, and
            receiving user input from the user, the user input indicating acceptance of the recommendation for the first extension and, in response, automatically:
                providing extension code that is executable to add a field extension to the respective table and to modify a user interface (UI) of an application for input of values corresponding to the first data type, and
                executing the extension code to deploy the extension and to modify the UI.

16. The system of claim 15, wherein operations further comprise, in response to receiving user input indicating acceptance of the recommendation for the first extension, determining default values for selective presentation in the UI for the first data type.

17. The system of claim 16, wherein determining default values comprises one or more of providing default values from the historical data and extracting default values from one or more attached documents.

18. The system of claim 16, wherein determining default values comprises initiating a machine learning (ML) platform to provide a ML model that is trained to generate the default values.

19. The system of claim 15, wherein operations further comprise determining a frequency of data values corresponding to the first data type within the field of the table, wherein providing a recommendation for a first extension corresponding to a first data type in the set of data types is executed in response to determining that the frequency at least meets a threshold frequency.

20. The system of claim 15, wherein operations further comprise:
    determining a frequency of data values corresponding to a second data type within the historical data; and
    determining to forego providing a recommendation for a second extension corresponding to the second data type in response to determining that the frequency fails to meet a threshold frequency.

* * * * *